No. 638,946. Patented Dec. 12, 1899.
G. C. UPDEGRAFF & C. C. STEWART.
TOASTER.
(Application filed Aug. 7, 1899.)
(No Model.)
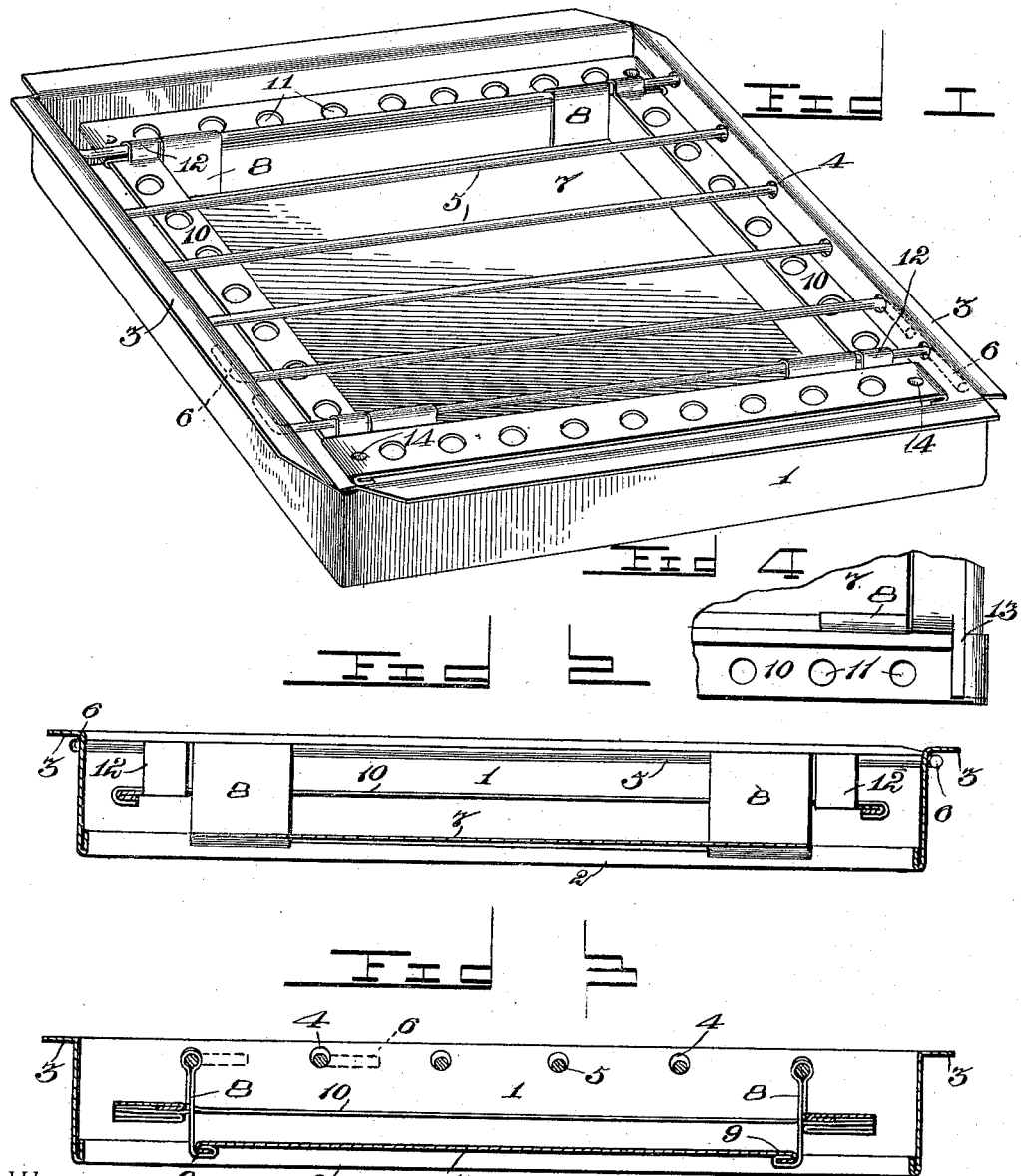
Witnesses
John Maupin
H. H. Riley
Inventors
George C. Updegraff
and
Charles C. Stewart
By their Attorneys,
C. A. Snow & Co.
THE NORRIS PETERS CO., PHOTO-LITHO., WASHINGTON, D. C.

UNITED STATES PATENT OFFICE.

GEORGE C. UPDEGRAFF AND CHARLES C. STEWART, OF HUTCHINSON, KANSAS.

TOASTER.

SPECIFICATION forming part of Letters Patent No. 638,946, dated December 12, 1899.

Application filed August 7, 1899. Serial No. 726,450. (No model.)

*To all whom it may concern:*

Be it known that we, GEORGE C. UPDEGRAFF and CHARLES C. STEWART, citizens of the United States, residing at Hutchinson, in the county of Reno and State of Kansas, have invented a new and useful Toaster, of which the following is a specification.

The invention relates to improvements in toasters.

The object of the present invention is to improve the construction of toasters and to provide a simple, strong, and inexpensive device designed especially for toasting bread, adapted to be used on a cook stove or range or a gas or gasolene stove, and capable of uniformly distributing and spreading the heat to prevent burning or scorching.

A further object of the invention is to provide a device of this character which will also be adapted for general cooking purposes, heating irons, and warming dishes and their contents where it is desirable to provide a uniform heat.

The invention consists in the construction and novel combination and arrangement of parts hereinafter fully described, illustrated in the accompanying drawings, and pointed out in the claims hereto appended.

In the drawings, Figure 1 is a perspective view of a toaster constructed in accordance with this invention. Fig. 2 is a vertical sectional view taken longitudinally of the rods. Fig. 3 is a similar view taken at right angles to Fig. 2. Fig. 4 is a detail view illustrating the manner of connecting the horizontal bars of the marginal deflecting-frame.

Like numerals of reference designate corresponding parts in all the figures of the drawings.

1 designates a rectangular supporting-frame composed of bars arranged edgewise, as clearly shown in Fig. 1, and constructed of sheet metal or other suitable material, their lower edges 2 being reinforced by folding the metal on itself, as illustrated in Figs. 2 and 3 of the drawings. The sides or bars are provided at their upper edges with horizontal flanges 3, and the frame 1 is preferably constructed of two strips of sheet metal, each strip being bent at right angles at its center to form two of the sides or bars, and the ends of the strips are secured together by suitable seams. The supporting-frame is provided at opposite sides with perforations 4, arranged in horizontal series adjacent to the horizontal flanges 3 and receiving supporting wires or rods 5, which have their terminals bent in opposite directions to form reversely-arranged arms 6, engaging the lower faces of the horizontal flanges 3, whereby the rods are prevented from rotating and are firmly held in place. Also by extending the arms 6 in opposite directions the wires are prevented from rattling when handling the device.

The wires or rods form a grid and are adapted to support toast, dishes for warming or cooking purposes, sad-irons, and the like, and the heat is spread and uniformly distributed by means of a rectangular deflector-plate 7, terminating short of the sides of the supporting-frame and forming a marginal opening for the passage of heat. The rectangular heat-deflecting plate is suspended from the end wires by vertical supports 8, consisting of strips of sheet metal provided at their upper ends with eyes to receive the said end rods and having their lower ends secured to the plate 7 at the opposite edges thereof. The edges 9, to which the supports 8 are attached, are reinforced by bending them on themselves, and the lower terminals of the said supports 8 are interlocked with the inwardly-bent edges 9, as clearly illustrated in Fig. 3 of the accompanying drawings. The heat, passing upward through the marginal spaces or openings at the edges of the deflecting or heat-spreading plate 7, is further deflected and caused to pass over the top of the bread being toasted or the other contents of the device by means of a marginal frame 10, composed of horizontal bars arranged at right angles to one another and located at a point between the plane of the plate 7 and the plane of the supporting-rods and provided with openings 11. The ends of the bars of the rectangular marginal frame are secured together, as clearly illustrated in Fig. 4 of the accompanying drawings, and the edges are bent upon themselves to reinforce the bars. The horizontal bars of the marginal frame, disposed at right angles to the supporting-rods, are split at their ends to form vertical and horizontal arms 12 and 13. The arms 12, which are arranged at the corners of the frame and which are shown longer in Figs. 2 and 3 than in Fig. 1, are provided at their upper ends with eyes to receive the end rods, and the longitudinal arms 13, which overlap the ends of the adjacent bars of the marginal frame, are secured to the same in bends thereof. By bending the bars around the arms and by indenting the parts at 14, as indicated in Fig. 1 of the drawings, the members of the marginal frame are securely and economically fastened together.

The plate 7 prevents the heat from passing directly upward to the horizontal supporting-rods and it spreads and directs the heat to the marginal openings, thereby increasing its intensity at the bottom of the device and producing a uniform heating of the contents of the same. The heat in passing upward through the marginal spaces is further deflected by the horizontal marginal frame, which permits a portion of the heat to pass through the perforations and which causes the heat to divide and pass around the side edges of its bars.

The invention has the following advantages: The device, which is simple and comparatively inexpensive in construction, possesses great strength and durability, and it is adapted for use on ranges, cooking-stoves, gas and gasolene stoves, and the like, and it may be advantageously employed for toasting bread, warming dishes and their contents, and cooking various substances where a uniform heat is desired.

Changes in the form, proportion, size, and the minor details of construction within the scope of the appended claims may be resorted to without departing from the spirit or sacrificing any of the advantages of this invention.

What is claimed is—

1. A device of the class described comprising a supporting-frame, rods mounted on the supporting-frame, a deflecting or spreading plate spaced from the supporting-frame to provide marginal openings, and a marginal deflecting-frame located at a point between the said plate and the rods, substantially as described.

2. A device of the class described comprising a supporting-frame, horizontal rods, a deflecting-plate spaced from the supporting-frame and located beneath the rods, arms extending upward from the supporting-plate and suspended from the rods, and a marginal deflecting-frame suspended from the rods and located at a point above the deflecting-plate, substantially as described.

3. A device of the class described comprising a supporting-frame, horizontal rods mounted thereon, a solid deflecting-plate suspended from the rods and spaced from the supporting-frame, a horizontal frame arranged above the marginal spaces or openings between the plate and the supporting-frame and provided with apertures, substantially as described.

4. A device of the class described comprising a supporting-frame provided at its upper edges with horizontal flanges and having perforations, rods passing through the perforations and provided with arms located beneath the flanges, a plate suspended from the rods and spaced from the supporting-frame, and a marginal deflecting-frame located above the plate and composed of bars, the bars crossing the rods being split to provide vertical and longitudinal arms, the vertical arms being secured to the rods and the longitudinal arms being fastened to the adjacent bars, substantially as described.

In testimony that we claim the foregoing as our own we have hereto affixed our signatures in the presence of two witnesses.

GEORGE C. UPDEGRAFF.
CHARLES C. STEWART.

Witnesses:
THEO. BOTKIN,
CLYDE BOTKIN.